United States Patent [19]

Rowe et al.

[11] 3,909,910
[45] Oct. 7, 1975

[54] METHOD OF JOINING THE ENDS OF TWO CONDUITS TOGETHER IN A STERILE MANNER

[75] Inventors: Arthur W. Rowe, Stamford, Conn.; Edward T. Marshall, Short Hills, N.J.

[73] Assignee: Union Carbide Corporation, New York, N.Y.

[22] Filed: Aug. 23, 1974

[21] Appl. No.: 499,931

Related U.S. Application Data

[62] Division of Ser. No. 346,087, March 29, 1973, Pat. No. 3,865,411.

[52] U.S. Cl. .......... 29/423; 29/157 R; 29/427; 29/446; 128/214 R; 137/15; 138/94.3
[51] Int. Cl.² .......................................... B23P 17/00
[58] Field of Search.......... 29/157 R, 401, 423, 446, 29/427; 285/23, 33, DIG. 12, 363, 364, 420; 138/89, 94, 94.3, 96 R; 277/10; 137/15; 128/214 R

[56] References Cited
UNITED STATES PATENTS

| 811,000 | 1/1906 | Tompkins | 277/10 |
| 1,271,567 | 7/1918 | Griffin et al. | 138/94 |
| 2,867,897 | 1/1959 | Emanueli | 29/401 |
| 3,044,479 | 7/1962 | Meyer et al. | 29/423 X |
| 3,306,563 | 2/1967 | Soto | 128/214 R X |
| 3,372,949 | 3/1968 | McLay | 285/364 |
| 3,510,929 | 5/1970 | Kilmarx | 29/423 X |
| 3,583,460 | 6/1971 | Faust | 138/89 X |
| 3,620,554 | 11/1971 | Ward | 29/157 R X |

FOREIGN PATENTS OR APPLICATIONS

| 1,300,635 | 8/1969 | Germany | 128/214 R |

Primary Examiner—Charlie T. Moon
Attorney, Agent, or Firm—M. W. Ryan

[57] ABSTRACT

A sterile connector for the end of a conduit employed in the passage of blood or of blood components which comprises a resilient, deformable gasket disposed about the terminal end of a conduit, a continuous, removable yieldable flexible strip material, a portion of which is removably adhered to said gasket and overlies the end of said conduit, said strip material having a free end, said strip material being in a generally U-shaped configuration, whereby a force applied to the free end thereof withdraws the entire strip material to expose the end of said conduit; a method of joining the ends of two conduits together in a sterile manner so that blood or its components can pass therethrough which comprises providing each end with a connector as described above, arranging them in face-to-face alignment so that the ends of the conduit are in registry, drawing the connectors together so that the gasket of each connector is deformed inwardly and so that the free ends of the strip material are substantially parallel and withdrawing the strip material from each of said connectors at the same time; a pair of conduits joined together by a pair of facing connectors as described above.

7 Claims, 5 Drawing Figures

METHOD OF JOINING THE ENDS OF TWO CONDUITS TOGETHER IN A STERILE MANNER

This is a division of application Ser. No. 346,087 filed Mar. 29, 1973, now U.S. Pat. No. 3,865,411.

BACKGROUND OF THE INVENTION

1. Field of the Invention

This invention relates to a method for connecting two tubings or conduits, employed for example for the passage of blood and its components, in a simple, sterile and relatively fool-proof manner, so that no contamination of the internal surfaces from extraneous matter can occur. More particularly, this invention relates to the connector itself and to a pair of conduits joined by the connector.

2. Discussion of Prior Art

In many fields, such as medicine, pharmacy and chemistry, it is often necessary to transfer fluids from one receptacle to another while keeping such fluids absolutely uncontaminated by extraneous materials, even those as elusive as air-borne spores or gaseous air pollutants. As an example, in the handling of human blood, it is frequently necessary or desirable to separate the blood into a number of its components, or to freeze the blood to be able to store it for long periods. Whenever a new connection must be made, however, to transfer the blood or blood component into another receptacle for washing, centrifuging or other processing, the possibility of contamination, even from air-borne materials, is present. Such a connection is conventionally accomplished by inserting a sterile needle attached by tubing to one receptacle into a sterile diaphragm connected to the other receptacle. In carrying out such a connection, the connector elements are subjected to possible contamination from air-borne bacteria, spores, etc., and from mishandling by the technician. As a consequence of this possibility, blood or blood components which have been subjected to a transfer operation by means of the conventional type of connector have been limited by government regulation to a useful life of 24 hours as opposed to a useful life of 21 days for blood which has not been so handled.

OBJECTS OF THE INVENTION

A prime object of this invention is to provide a simple system for connecting two blood receptacles in a sterile, fool-proof manner, so that the useful life of the transferred blood or blood component can be extended to more than 24 hours. This same system also finds application in other fields where complete freedom from contamination is required in the transfer of fluid from one receptacle to another.

SUMMARY OF THE INVENTION

The objects of the invention are accomplished by a sterile connector attached to the end of a conduit which connector comprises a resilient, deformable gasket disposed about the terminal end of the conduit, a continuous, removable, yieldable, flexible strip material, a portion of which is removably adhered to the gasket and overlies the end of the conduit, the strip material having a free end and, being in a generally U-shaped configuration, whereby a force applied to the free end thereof withdraws the strip material to expose the end of the conduit.

In a particularly desirable embodiment, the gasket is supported by a generally T-shaped flange material disposed about the conduit and inwardly of the gasket, that is on the side opposite the end of the conduit. It should be understood that the flange member is circular but has a T-shaped cross-section, as will appear from the disclosure below.

The conduits are joined in a simple, sterile and foolproof manner whereby contamination is precluded by a method which comprises providing each end of conduit to be joined with a connector as described above, arranging the connectors in face-to-face alignment so that the ends of the conduit are in registry with one another, drawing the connectors together, with conduit, so that the gasket of each connector is deformed inwardly and so that the free ends of the strip material are substantially parallel, and withdrawing the strip material from each of said connectors at the same time. Preferably, the connectors are drawn together and held together in compressed clamping relationship by a suitable clamp member which will hold the gaskets in deformed condition while the strip material is withdrawn therefrom. Preferably, the strip material is withdrawn as a unit, i.e., the strip materials are brought together in alignment with one another and are withdrawn by pulling the same.

The strip material can have any suitable adhesive substance on its side facing the gasket. Additionally, at least on the side facing outwardly, it can have an adhesive substance which will facilitate the securement of the free end at its outer face to the free end of a facing strip material of a connector disposed about an end of a conduit to be joined to the first conduit of the first connector. This facilitates withdrawal of the strip material as a unit. It will be appreciated, therefore, that a continuous strip material having an adhesive substance on one side thereof can be utilized. Toward one end of the strip material, the adhesive will secure the strip material to the gasket. Toward the other end thereof, i.e., on the other end of the U-shaped configuration, the strip material will have its adhesive facing outwardly so as to facilitate its securement to the free end of an opposing strip material, whereby the same can be withdrawn as a unit.

The principle of the present invention is to superimpose two diaphragms, one attached to each end of two similar connector fittings, and, while they are held tightly together in an air-tight manner, to invaginate them by pulling them in upon themselves and thus withdrawing them from the connector assembly. In this way, the outer contaminated surfaces of the two diaphragms are removed from the assembly without ever having been exposed to the internal surfaces of the connector.

BRIEF DESCRIPTION OF THE DRAWINGS

The connector of the invention and the method of carrying out the invention can be more readily understood and appreciated when reference is made to the accompanying drawings in which:

In FIG. 2 the connector is no longer in section;

In FIG. 3 there is shown a clamping means disposed about a flange member as will appear from the discussion below;

In FIG. 5 the strip material has not been entirely withdrawn from the connector assembly.

DESCRIPTION OF SPECIFIC EMBODIMENTS

Figure 1:
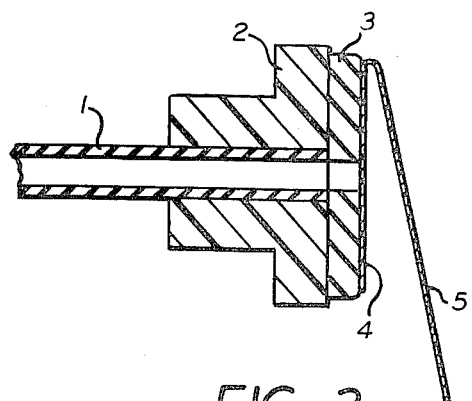
FIG. 1 is a side elevation of the connector in section.
Figure 2:
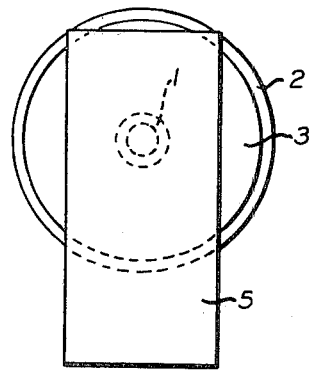
FIG. 2 is an end view of the connector of the invention taken from the right of the view depicted in FIG. 1.

Referring to the drawing, FIG. 1 shows an example of the fitting that is attached to the flexible tubing or conduit 1 leading from a receptacle. An annular flange 2 of plastic or other suitable material is attached to the tubing. A compressible gasket 3 made from an appropriate elastomeric or plastic compound such as a foamed vinyl is firmly adhered to the face of the flange. A diaphragm 4, in the form of a generally U-shaped strip material, consisting of a thin strong film of plastic, such as polyvinyl chloride or polyester or other appropriate material, is attached to the gasket with an easy-releasing type of adhesive. The diaphragm 4 has a tab or free end 5 of its own material which when folded back upon itself extends beyond the gasket to act as a draw-pull. The entire assembly is factory-sterilized so that all enclosed areas are completely free of any contamination.

Figure 3:
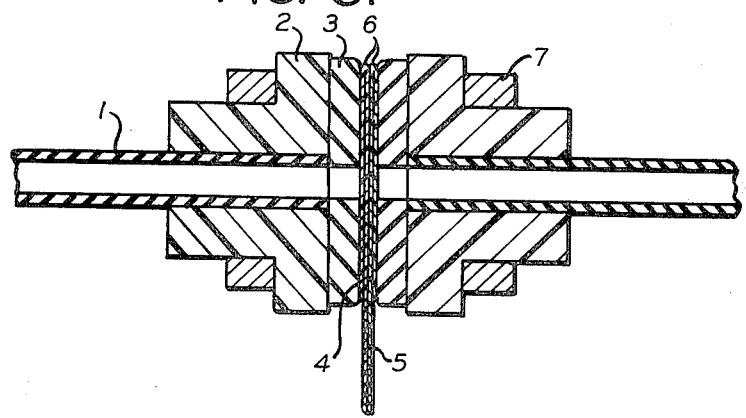
FIG. 3 is a side elevation of a pair of connectors in section showing them about to be connected.

Referring to FIG. 3, two of the fittings described in FIG. 1 are brought together so that the folds 6 of the U-shaped strip material in the respective diaphragms are together and the tabs 5 are superimposed upon each other and extend out beyond the gasket. The fittings have markings or extended lips so that they can not be brought together in any other juxtaposition than as shown. The assembly of the two fittings is then clamped together by an appropriate mechanical means 7, i.e., a spring-loaded clamp or a snap-fitting bail, so that the two gaskets are compressed against each other with a predetermined amount of pressure to form a tight seal. The extended diaphragm tabs 5 are then held together by the technician and are pulled out manually as one unit from between the elastic gaskets. In so doing, the internal diaphragms are invaginated or pulled in upon themselves and withdrawn from the connector assembly while the elastic gaskets continue to maintain a tight seal.

Figure 5:
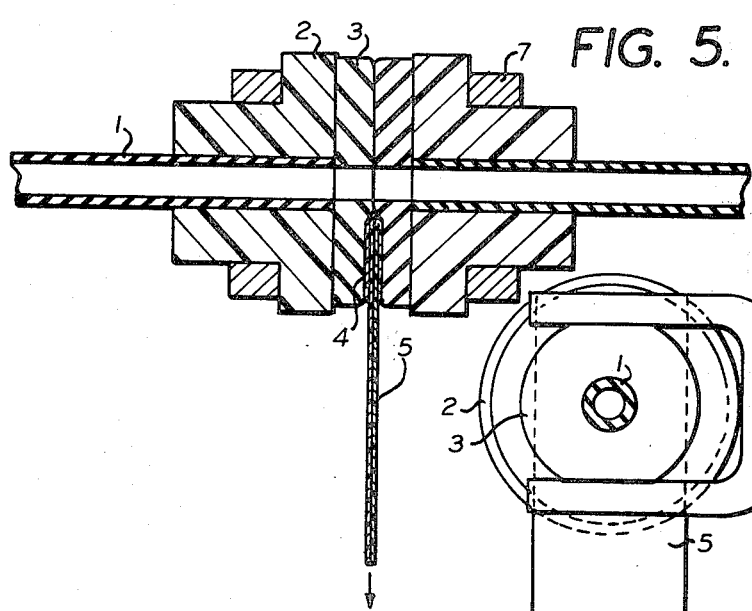
FIG. 5 is a view similar to FIG. 3 showing the disposition of the gasket upon withdrawal of the strip material.
Figure 4:
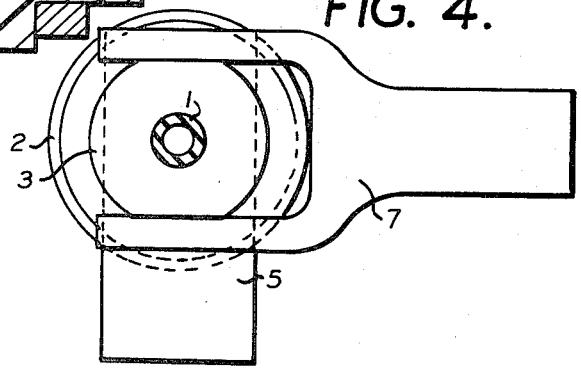
FIG. 4 is an end view similar to FIG. 2 showing the disposition of the clamp member about the flange.

FIG. 5 is an illustration of the withdrawal when it is partially complete. The diaphragms are discarded when withdrawn, leaving a tight sterile connector assembly ready for the transfer of fluid.

From the above description it is apparent that by a simple and inexpensive means there is provided a sterile and relatively fool-proof connection between conduits. These conduits can then readily be utilized for the passage of blood, blood components, or any fluid desired to be handled under and maintained in sterile condition. The connector means can readily be assembled to the ends of conduits by simple means. The likelihood of contamination is markedly reduced, if not totally eliminated.

It will be apparent that the present invention is capable of numerous different embodiments and variations. Any substance approved for use in contact with the fluid to be transferred can be used, provided, of course, that it has the physical characteristics required as outlined above. This includes the use of numerous plastics, elastomers, or other material approved for safe use with human blood. Accordingly, it should be understood that the terms and expressions used herein have been used for the purposes of illustration and not of limitations, as there is no intention, in the use of such terms and expressions, of excluding any equivalents, or portions thereof, as various modifications and departures from the above disclosure will be apparent to one skilled in the art.

What is claimed is:

1. A method of joining the ends of two conduits together in a sterile manner which comprises providing each end of the conduits to be connected with a connector which comprises a resilient, deformable gasket disposed about the terminal end of a conduit, a continuous, removable, yieldable, flexible strip material, a portion of which is removably adhered to said gasket and overlies the end of said conduit, said strip material having a free end, said strip material being in generally U-shaped configuration whereby a force applied to the free end thereof withdraws the entire strip material to expose the end of the conduit, arranging the connectors in face-to-face alignment so that the ends of the conduit are in registry, drawing the connectors together so that the gasket of each connector is deformed inwardly and so that the free ends of the strip material are substantially parallel and withdrawing the strip material from each of said connectors at the same time.

2. A method according to claim 1 wherein each connector has a flange member to which the gasket is attached.

3. A method according to claim 2 wherein the flange has a T-shaped cross-section.

4. A method according to claim 1 wherein the strip material is withdrawn as a unit.

5. A method according to claim 4 wherein the connectors are drawn together through use of a clamp.

6. A method according to claim 5 wherein the clamp is a spring-loaded clamp.

7. A method according to claim 4 wherein the clamp is a snap-fitting bail.

\* \* \* \* \*